Oct. 16, 1956   J. F. CROUGH   2,766,588
PUMP AND MOTOR HYDRAULIC SYSTEM
Filed March 5, 1951   3 Sheets-Sheet 2
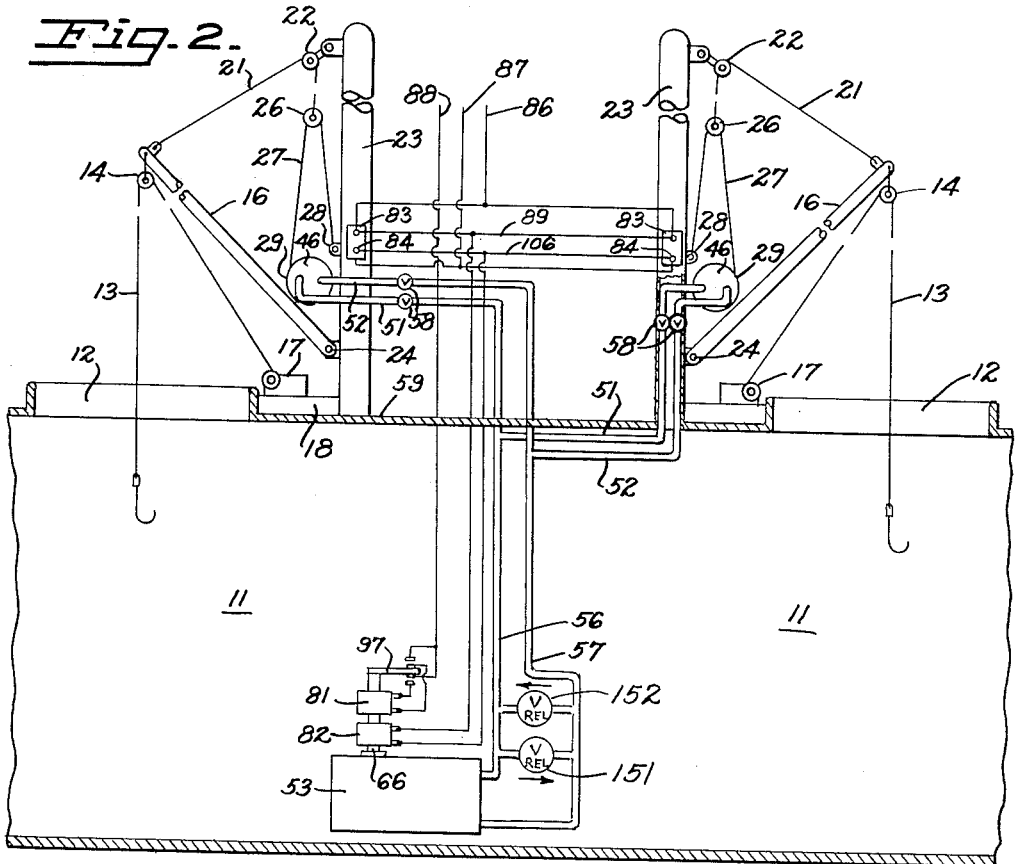
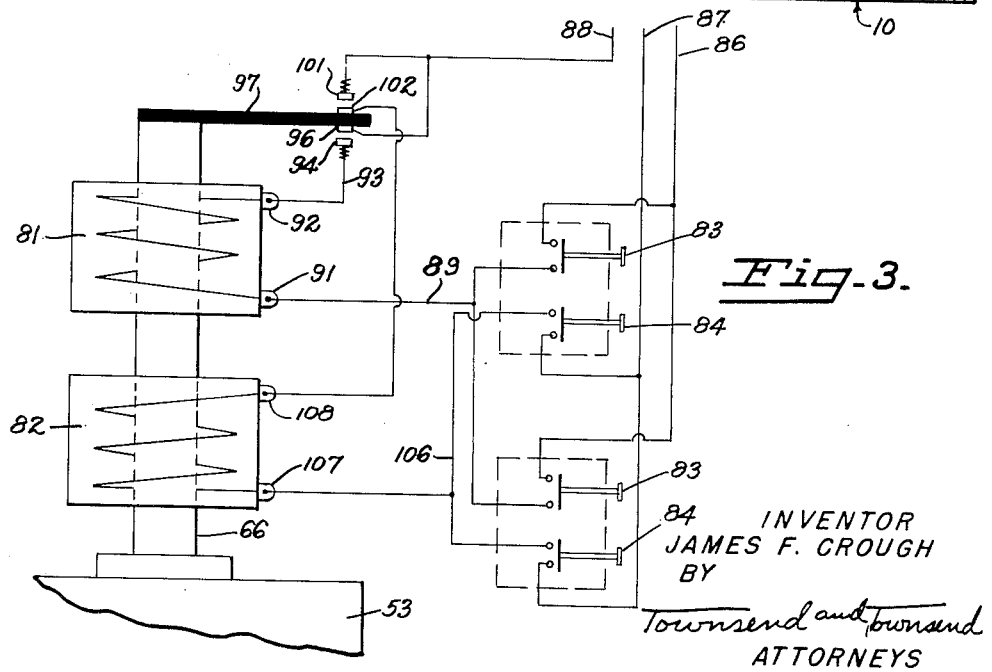
INVENTOR
JAMES F. CROUGH
BY
Townsend and Townsend
ATTORNEYS Oct. 16, 1956    J. F. CROUGH    2,766,588
PUMP AND MOTOR HYDRAULIC SYSTEM
Filed March 5, 1951    3 Sheets-Sheet 3

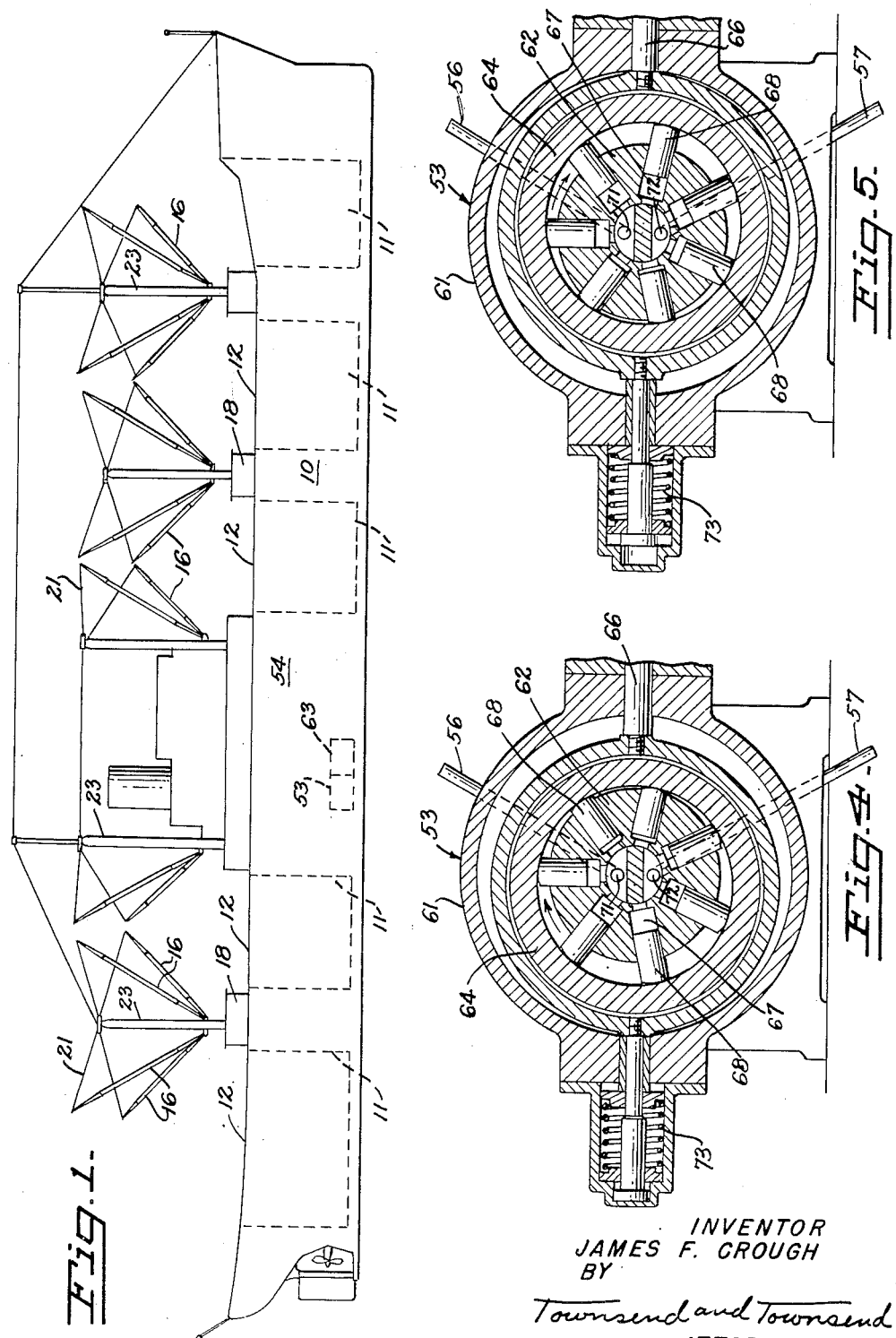

INVENTOR
JAMES F. CROUGH
BY
Townsend and Townsend
ATTORNEYS

2,766,588
PUMP AND MOTOR HYDRAULIC SYSTEM

James F. Crough, Richmond, Calif.

Application March 5, 1951, Serial No. 213,894

7 Claims. (Cl. 60—53)

This invention relates to new and useful improvements in a pump and motor hydraulic system. More particularly, the invention relates to a system of actuation of the topping line controlling the elevation of a cargo boom in a cargo carrying vessel.

At the present time modern cargo vessels employ a cargo line which is controlled by a cargo winch located on the deck of the vessel in order to raise and lower cargo from the hold. Said cargo line passes over a sheave at the outer end of a cargo boom, said cargo boom customarily extending upwardly and outwardly to a position substantially over the hatchway of the hold. The present invention relates to means for raising and lowering said cargo boom so that when the vessel is under way the boom may be lowered to a horizontal position, and when the vessel is in port and discharging cargo, the boom may be raised to operating position.

Cargo booms have customarily been raised or lowered by hand. For such purpose a topping line is attached to the upper outer end of the cargo boom, said line passing from the boom over a sheave located at an elevated position on a mast or king post and then down the mast or king post to a position at deck level. An attendant may raise or lower the cargo boom by running the line. In lieu of manual operation, power operated winches have been employed, said winches being customarily operated by an electric motor. Both of these means of running the topping line have certain disadvantages which are overcome in the instant invention. There are numerous disadvantages to hand operation of the topping line. One of the most important of these is the danger present if a hand negligently drops the line permitting the cargo boom to fall or if the operator becomes entangled in the topping line and is raised off the deck, which many times results in mangling of the hands of the operator in the sheave or other serious injury. Other disadvantages of hand operation are the manual effort required and the presence of operating ropes, cables, chains, etc., on or near the deck level where they constitute a hazard and detract from the trim appearance of the vessel.

One of the disadvantages of the employment of an electrically operated winch is the danger in the event of power failure. Another disadvantage is the fact that the electric motor operating the winch is located in an exposed portion of the deck and the action of the atmosphere may damage the motor to the extent that the operation of the boom is impaired.

The instant invention employs a topping winch which is hydraulically operated by a hydraulic motor. Said motor is entirely encased and has no exposed moving parts and is therefore not subject to deterioration by atmospheric conditions on deck. Thus, the possibility of corrosion of the motor and consequent impairment of the operation of the cargo boom is eliminated by the present invention. The pump which drives the hydraulic fluid through the hydraulic motor is located below deck, preferably in the engine room where also is located the electric motor which drives the pump. Thus the pump and motor are not subject to deterioration which would occur if they were located on the deck of the vessel. Further, the invention contemplates both electrical and hydraulic controls governing operation of the winch and thus the boom cannot be raised or lowered unless both the hydraulic valves for the hydraulic lines and the electric button for the electric motor operating the hydraulic pump are manually actuated. Further, the winch itself employs a band brake and a ratchet and pawl which provide additional safety features. All cables, chains and pad eyes are removed from the deck, making for better housekeeping and neatness.

Maintenance of the equipment is minimized by reason of the fact that the pump and motors employed require very little, if any, attention or repair.

Labor costs are reduced in that the cargo boom may be raised or lowered by a single operator without manual effort other than turning valves and pushing buttons. No extensive training is needed to operate this simple equipment and, further, the danger of an operator losing control of the cargo boom and injuring either himself or others is minimized.

This entire unit is further protected by relief valves in the pump. These valves will be set to open when the strain of a topping line reaches the danger point, substantially below the breaking point of the line. When this by-passing occurs the boom will remain stationary until the obstruction causing the overload is removed. It can be seen, therefore, that there is no damage to the system, even when the boom is obstructed, in that when an overload occurs hydraulic fluid is by-passed. In other systems, such as electrical systems, such a sensitive overload relief is not possible in that before an overload switch is actuated a line may be broken, whereupon the boom it supports may fall.

The power unit which is used in operating the winches may be used for other purposes aboard the vessel, as for example, for operation of capstans or other winches.

Other objects of the present invention will become apparent upon reading the following specification and referring to the accompanying drawings in which similar characters of reference represent corresponding parts in each of the several views.

In the drawings:

Fig. 1 is a schematic elevation view of a poriton of a vessel illustrating the relationship of the cargo boom, king post and discharge of cargo from a hold.

Fig. 2 is a diagrammatic view of a portion of the vessel showing the instant invention incorporated in the cargo hoisting equipment. Said Fig. 2 illustrates two modifications of the invention; namely, one wherein the hydraulic lines are exposed and another wherein the hydraulic lines are enclosed within the hollow king posts of the vessel.

Fig. 3 is a wiring diagram of the electrical circuit employed.

Fig. 4 is a vertical sectional view through the hydraulic pump showing said pump in one position.

Fig. 5 is a view similar to Fig. 4 showing the pump in the opposite position.

Figure 6:
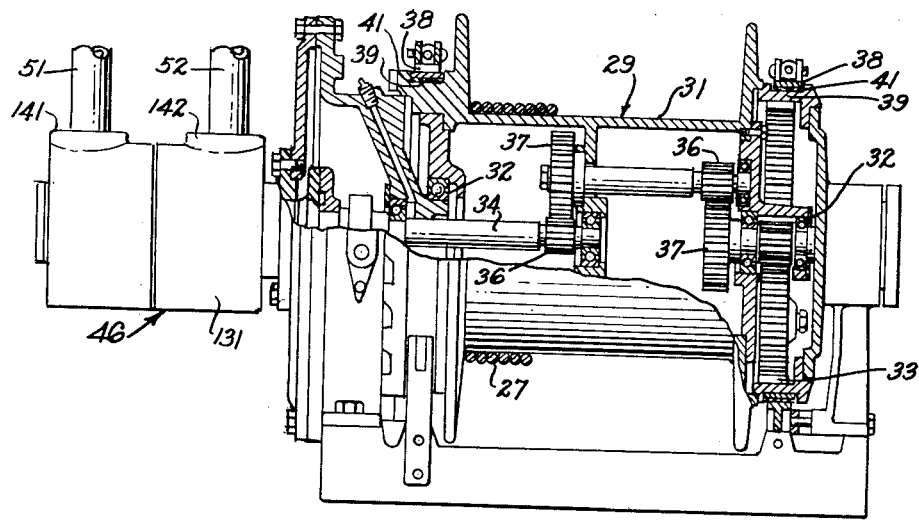
Fig. 6 is a vertical section through a winch.

The instant invention is designed for use on a modern cargo vessel 10 wherein is located a plurality of holds 11 in the hull of the vessel; access to said holds being gained through hatchways 12 on the deck of the vessel. In order to raise and lower cargo through the hatchway 12, at least one load line 13 is arranged to be lowered into each hold for raising and lowering said cargo. Each said load line 13 passes over a sheave 14 located in the upper or outer end of a cargo boom 16 and then passes to a cargo winch 17 located on the deck house 18 adjacent said hatchway. By winding and unwinding said cargo winch 17, the load line 13 may be raised and lowered. At least one cargo boom 16 is provided at each hatchway 12, each boom being individually controlled.

It is desirable that the cargo boom 16 be lowered to a horizontal position when not in use so as not to constitute a hazard to the personnel of the vessel, and to prevent damage to the boom when not in use. The instant invention relates to means for selectively lowering each said boom to a horizontal position when not in use and raising each said boom to cargo working position when it is desired to load and discharge cargo. Accordingly, to the upper outer end of each said cargo boom 16 is attached a topping line 21, said line passing over a sheave 22 located at the elevated position on the vertical king post 23 or mast of the vessel. The lower end of the cargo boom 16 is pivotally connected to said king post 23 or mast by means of a heel pin 24 in a manner well known in this art. The inner end of the topping line 21 is attached to a sheave 26. Around said sheave 26 passes a line 27, one end of which is fixed to the lower part of king post 23 at point 28 and the opposite end of which is passed around topping line winch 29. The operation of said winch is hereinafter described. However, it will be apparent, particularly from Fig. 2 that, by winding and unwinding line 27 around winch 29, sheave 26 may be raised or lowered, which in turn raises or lowers cargo boom 16 from operating to horizontal position as desired.

Winch 29 may be of any sturdy type, preferably with the working parts thereof enclosed so that they do not deteriorate by reason of exposure to the atmosphere. The details of construction of said hoist form no part of the present invention. One said hoist is illustrated in Fig. 6 wherein it will be seen that a rotatable drum 31 is provided around which line 27 passes. Said drum 31 is mounted in bearings 32 at either end of the axis thereof, and is rotated by reason of rotation of an internal ring gear 33 fixed for rotation with said drum. Said ring gear 33 is driven by a speed reduction gear train from shaft 34 at the opposite end of said drum. Thus rotation of shaft 34 causes rotation of drum 31, but at a considerably reduced speed by reason of the gear ratios of the pinions 36 and gears 37 used in said gear train. The hand operated brake 38 of any common variety is arranged to engage and disengage a brake drum 39 on said winch, with a brake lining 41 interposed between said brake and said brake drum. Thus manual actuation of a conventional brake lever (not shown) causes brake 38 to engage lining 41 against said brake drum 39 and bring winch 29 to stationary position. It will be understood that the details of construction of said winch are subject to considerable modification.

Figure 7:
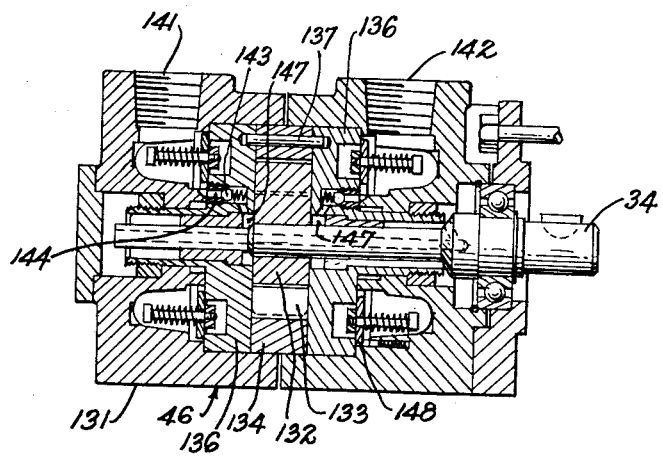
Fig. 7 is a vertical section through a hydraulic motor operating said winch.

Winch 29 is actuated in either direction by reason of direct connection of shaft 34 to a hydraulically operated motor 46. The details of construction of the hydraulic motor are also no part of the instant invention. One such hydraulic motor 46 is illustrated in Fig. 7 and is illustrated and described in considerable detail in U. S. Patent No. 2,393,223, issued January 15, 1946, to Rosen. Said motor is a vane type which is reversible in that it can be driven with equal facility in either directon, depending upon the direction of flow of hydraulic fluid therethrough.

Said motor comprises a split housing 131 within which is rotatably mounted shaft 34. Keyed to said shaft 34, centrally of said housing 131, is a rotor 132 having a plurality of radially disposed slots within which are slidably held vanes 133. Surrounding rotor 132 is stationary cam ring 134, which is substantially annular, the inner edge of said ring being of varying radial distance from said shaft 34. The outer end of vanes 133 bear against said ring 134. Ring 134 and rotor 132 are of equal thickness and on either side thereof is a non-rotatable port plate 136, each of which is pinned to ring 134 by pin 137. Thus as hydraulic pressure against one face of a vane 133 acts upon said vane, rotor 132 is caused to revolve, the amount of projection of each vane 133 being limited by cam ring 134.

Fluid may enter either through port 141 or 142, connected to lines 51 and 52, respectively. Fluid passes through check valves 143 in passage 144 in port plate 136 and thence to annular chamber 147 having conventional passages (not shown) dividing the flow of fluid partially to force vanes 133 radially outwardly against cam ring 134 during the portion of the cycle when said vanes are operating to perform work, and partially to provide fluid under pressure behind said vanes to rotate rotor 132. Fluid pushed ahead by rotation of vanes 133 is discharged outwardly into chamber 147 in the opposite port plate 136, thence escaping outwardly past check plate 148 and out the opposite port.

Said motor is thus reversible in direction since each half of the motor is identical, and reversal of direction of flow of fluid reverses the direction of rotation of shaft 34.

The flow of hydraulic fluid through hydraulic motor 46 is controlled by the flow of said fluid through branch lines 51 and 52. Flow of fluid through branch line 51 results in raising of the cargo boom; flow of fluid through branch line 52 results in lowering of the cargo boom. It will be understood that there is an individual topping winch 29 for each cargo boom 16, and each said winch 29 is actuated by its individual hydraulic motor 46, said motor 46 being in turn operated from a single hydraulic pump 53 located in the hold of the vessel, preferably in the engine room 54. A pair of hydraulic lines 56 and 57 lead from said pump upwardly to a point immediately below the deck of the vessel, and from said point lines 51 and 52 branch out to the various topping winches. In each of said branch lines 51 and 52 is located a valve 58, said valve being located at a point which is accessible to the operator of the winch so that in case of emergency the operator may readily close the valve and prevent further flow of hydraulic fluid. Upon closing of either or both valves 58 the flow of fluid through hydraulic motor 46 is stopped, thereby preventing further movement of cargo boom 16 from the position occupied when valve 58 was closed. It will be noted, by reference to Fig. 2, that branch lines 51 and 52 may run above the deck level 59 of cargo winch 29 as shown in the left hand portion of Fig. 2 or that said branch lines 51 and 52 may run below the deck level 59 and then up through the hollow king post 23 to the hydraulic motor 46 as shown in the right hand portion of Fig. 2. In either event valves 58 controlling flow of fluid through the lines 51 and 52 are preferably located adjacent hydraulic motor 46 actuating the particular topping winch 29 being operated.

Pump 53 which forces fluid through hydraulic lines 56 and 57 is reversible and may be of any conventional type, preferably a radial piston, axial gear, or vane type pump. One said pump is illustrated in Figs. 4 and 5. It will be seen that a cylindrical casing 61 as provided within which is a rotor 62 driven by an electric motor 63. Between rotor 62 and casing 61 is an eccentric ring 64. Said ring may be caused to shift from left to right by reason of its connection to an axially slidable actuating rod 66 extending out through casing 61 in a direction transverse to the axis of rotation of the rotor 62. Rotor 62 is provided with a plurality of radially extending cylinders 67 in which are mounted pistons 68 with integral crossheads which rotate on antifriction bearings (not shown) within eccentric ring 64. As long as rotor 62 and eccentric ring 64 are concentric, there is no reciprocating motion of pistons 68, and the pump delivery is zero. If, however, eccentric ring 64 carrying the crossheads and pistons 68 is moved off center, the pistons are forced to reciprocate in the cylinder bores 67 causing a positive pumping action and discharge of oil outwardly from one of the ports 71 or 72 of the pump. Thus, if eccentric ring 64 is moved off center to the ringht, as shown in Fig. 5, the flow of oil through pump 53 is in one direction, whereas if moved off center to the left (Fig. 4), the flow is in the opposite direction. Thus, by movement of control rod 66 to the right or the left, the direction of discharge of pump is controlled. Spring 73 tends to hold said eccentric ring 64 in neutral position.

In the instant invention solenoids 81 and 82 are employed to move control rod 66 of hydraulic pump 53 in order to move eccentric ring 64 from one side to the other or to neutral position. Said solenoids are actuated by an electric circuit, hereinafter described, and said electric circuit is energized by a plurality of button switches 83 and 84 located adjacent topping winches 29 in proximity to said winches and valves 58. An up switch 83 and a down switch 84 is provided for each winch. By the operator pressing "up" button 83 on any of the topping winches solenoid 81 is energized to cause the eccentric ring 64 to shift in a direction to force hydraulic fluid through hydraulic motor 46 in such direction to turn winch 29 to raise cargo boom 16.

On the other hand, pressing of "down" button 84 adjacent any of the winches will cause solenoid 82 to be energized in such manner as to lower the boom 16. Inasmuch as individual hydraulic valves 58 are provided for each said boom, it will be understood that only the winch located at the boom where both valves 58 are open will be operated at any given time. At all other booms, one or more of the valves 58 will be closed, which will prevent actuation of the winches governing said booms.

It will be understood that whereas pump 53 has been illustrated and described in some detail, other types of pumps which can be governed by solenoid controls may be employed.

The electrical circuits which energize solenoids 81 and 83 on pump control rod 66 are illustrated in Fig. 3. Three electric lines 86, 87 and 88 are employed in a conventional three phase circuit. Upon manual closing of any "up" button 83 a circuit is established from electric power line 86 through up switch 83 to line 89 which leads to terminal 91 of solenoid 81. The opposite terminal 92 of solenoid 81 is connected by line 93 to spring contact 94. Spring contact 94 is of such character that when the control rod 66 is in neutral position, electrical contact is established between said spring contact 94 and contact 96 borne by arm 97 fixed to control rod 66. If contact is established between contacts 94 and 96, a circuit is closed through said contacts to line 88 of the three-phase electrical circuit. Upon completion of said circuit, solenoid 81 is actuated and moves downwardly which changes the position of eccentric ring 64 of pump 53 in such a direction as to cause hydraulic fluid to flow outwardly through line 56. If both valves 58 of any winch 29 are open, hydraulic fluid flows through the hydraulic motor 46 connected to said winch and causes boom 16 to raise. Thus, the operator may press the up button 83 at any control station in order to raise the cargo boom 16 at said station provided both valves 58 of the hydraulic lines 51 and 52 for said station are open.

It will be noted that upon downward movement of control rod 66, contact between second spring contact 101 and contact 102 on arm 97 attached to control rod 66 is broken after solenoid 81 has moved rod 66 a predetermined distance. Upon breaking of said contact, it is impossible for the operator to press down button 84 at any location and cause the two solenoids 81 and 82 to be energized simultaneously. Thus, only upon release of up button 83 may a circuit be established upon closing of a down button 84.

If the operator desires to stop the movement of boom 16, he releases both the up and the down buttons 83 and 84, thereby returning the control rod 66 of the pump 53 to a neutral position and stopping the flow of hydraulic fluid from pump 53. He also immediately closes one or both valves 58 which prevents operation of motor 46 if a switch 83 or 84 at another location is closed.

Upon the operator pressing down button 84 at any station, a circuit is established from line 87 through down switch 84 to line 106 connected to one terminal 107 of second solenoid 82. The opposite terminal 108 of said solenoid is connected to contact 102 borne by arm 97 rigidly fixed to the control rod 66. If pump 53 is in neutral or down position, contact is established through contact 102 and spring contact 101 (which is similar in construction to spring contact 94) and thence to line 84 of the three-phase circuit. It will be observed that upon movement of rod 66 upwardly, upon pressing of down button 84, contact is broken between spring contact 94 and contact 96 after solenoid 82 has moved the control rod 66 a predetermined short distance. Breaking of said contact prevents the operator from actuating solenoid 81 by pressing an up button 83 while down button 84 is being pressed. Contact is broken when down button 84 is released and thereupon pump 53 is restored to neutral position and the operator simultaneously closes one or both valevs 58.

Pressure relief valves 151 and 152 of conventional structure may be installed in lines 56 and 57, respectively, to bypass part of the flow of hydraulic fluid from the discharge to the intake side of pump 53. Thus, if boom 16 should hit an obstruction or the unit should be "two-blocked," winch 29 will remain stationary instead of winding line 27 until it parted. Excess fluid above that necessary to hold winch 29 stationary will be by-passed. The pressure relief valves 151 and 152 will be set so as to by-pass fluid when the strain on line 27 is substantially below its breaking point, for example, at 50% to 60% of said breaking point.

*Operation*

In operation, it will be assumed that cargo boom 16 is in horizontal position and that the vessel has reached port, electric motor 63 has been started and it is desired to handle cargo through open hatchway 12. Upon a hatch being selected, it is necessary to raise cargo boom 16 adjacent said hatch in order to place cargo load line 13 in proper position. The operator opens both valves 58 leading to the hydraulic motor 46 connected to the topping winch 29 controlling movement of the cargo boom 16 to be raised. The operator then presses up button 83 at the switch box located adjacent said selected cargo boom 16 and continues to press said up button until said boom has traveled the desired distance. Closing of up button 83 energizes the circuit which throws the control rod 66 of hydraulic pump 53 in such position as to cause hydraulic fluid to be forced outwardly through line 57, thence through the particular branch line 52 leading to the selected motor 46, past valve 58 and to hydraulic motor 46 connected to the winch 29. This causes the winch to wind in topping line 21 thereby raising cargo boom 16. Upon completion of movement of boom 16 to the desired location, up button 83 is released by the operator and valves 58 are closed until discharge of the cargo is completed. Brake 38 is also set after the cargo has been discharged. when it is desired to lower cargo boom 16, the operator opens valves 58, releases brake 38, and pushes down button 84. This throw pump control rod 66 in the opposite direction and causes pump 53 to force hydraulic fluid outwardly through line 56 and branch line 51 through hydraulic motor 46 in the opposite direction, causing line 27 to be unwound from winch drum 31. When the cargo boom 16 is in horizontal position, the operator releases down button 84 restoring pump 53 to neutral and stopping movement of the boom. Thereupon valves 58 are closed, brake 38 set, and the boom 16 is then locked in closed position until it is desired again to raise the same.

It will thus be seen that by simple controls consisting of valves 58, electric switch buttons 83 and 84, and brakes 38, cargo boom 16 may be raised or lowered at will any desired distance. In the event of electrical failure, pump 53 is automatically restored to neutral position and movement of winch 29 controlling the cargo boom is stopped. In the event of breakage of any hydraulic line leading to any hydraulic motor 46, the operator need close only one or both valves 58 adjacent said hoist to immediately stop hydraulic motor 46. Setting of brake 38 also stops winch 29; thus, it will be seen that the device which is the subject of this invention is extremely safe in operation and it is impossible for electrical or hydraulic failure to endanger boom 16, cargo or personnel of the ship.

Although the present invention has been described in some detail by way of illustration and example for purposes of clarity of understanding, it is understood that certain changes and modifications may be made within the spirit of the invention and scope of the appended claims.

I claim:

1. An electric control circuit for movement of a control arm to first, neutral and second positions comprising, a first solenoid, operable upon energization to move said control arm to first position, a second solenoid operable upon energization to move said control arm to second position, means biasing said control arm toward neutral position, a contact arm movable with said control arm, a first and a second movable contact carried by said contact arm, a third and a fourth stationary contact, said first and third contact being engageable when said control arm is moved to neutral or to second position, said second and fourth contact being engageable when said control arm is moved to neutral or to first position, a plurality of normally open first switches, a plurality of normally open second switches, three electric wires from a source of electric current, the first said wire being connected to one contact of each said second switch, the third said wire being connected to said first movable and said third stationary contact, a fourth lead wire connecting the other contact of each said first switch to one terminal of said first solenoid, a fifth lead wire connecting the other terminal of said first solenoid to said fourth contact, a sixth lead wire connecting the other contact of each said second switch to one terminal of said second solenoid, and a seventh lead wire connecting the other terminal of said second solenoid to said first contact.

2. A system for actuation of a plurality of hydraulic motors in either direction of rotation or neutral position comprising a plurality of reversible hydraulic motors, two motor ports for each motor, a manually operable first and second valve for each motor, a reversible discharge hydraulic pump, two pump ports for said pump, a direction of discharge control for said pump, hydraulic lines connecting one pump port with one motor port of each said motor, a first and second control switch for each said motor, an electric circuit energizable upon closing of any first switch to actuate said control to discharge said pump through one of said pump ports and upon closing of any second switch to actuate said control to discharge said pump through the other of said pump ports, said circuit comprising three wires from a source of electric current, a first and a second oppositely acting solenoids arranged to move said discharge control, a switch arm fixed for movement with said discharge control, a first and a second movable contact carried by said switch arm, a first and a second stationary spring contact engageable with said first and second movable contact, respectively, during a portion, but not all, of the stroke of said switch arm, a first wire of said source of current being connected to one contact of each first switch, a second wire of said source of current being connected to one contact of each second switch, a third wire of said source of current being connected to said first spring contact and also to said second movable contact, a fourth wire connecting the other contact of each said first switch with one terminal of said first solenoid, a fifth wire connecting the other terminal of said first solenoid with said second spring contact, a sixth wire connecting the other contact of each said second switch with one terminal of said second solenoid, and a seventh wire connecting the other terminal of said second solenoid with said first movable contact.

3. A hydraulic power transmission system comprising a plurality of hydraulic motors, at least two motor parts for each said motor, each said motor being reversible in direction upon hydraulic fluid flow inwardly through one or the other of said motor ports, a hydraulic pump, at least two pump ports for said pump, a control rod operatively connected to said pump arranged to change the direction of fluid flow with respect to said pump ports and to stop fluid flow through said pump, means to drive continuously said pump, hydraulic lines connecting one of said pump ports with one of said motor ports of each of said motors and the other of said pump ports with the other of said motor ports of each of said motors, an electric circuit, a plurality of manually controlled switches in said circuit at each of multiple stations, a station being located near each of said multiple motors, electric means operable when said circuit is energized to move said control rod to any of at least three positions governing discharge of said pump, said positions including a first position at which said pump does not discharge, a second position at which said pump discharges through one of said ports, a third position at which said pump discharges through the other of said ports, one of said switches at each of said multiple stations upon being closed energizing said circuit to move said control rod to said second position, another of said switches at each of said multiple stations upon being closed energizing said circuit to move said control rod to third position, means operable to move said control rod to first position when none of said switches is closed, and valve means manually operable at each of multiple stations adjacent said hydraulic motors to control hydraulic flow through said hydraulic motors.

4. The system of claim 3 in which said plurality of manually controlled switches comprises an off-switch and an on-switch at each said station, a first and a second contact carried by said rod, stationary third and fourth contacts engageable with said first and second contacts, respectively, depending upon the position of said rod, said contacts being positioned relative to each other to energize said circuit to hold said rod at said second position when any on-switch is closed.

5. The system of claim 4 in which said contacts are located relative to each other so that said control rod will be moved from said second position to said third position only after passing through said first position.

6. The system of claim 3 in which said valve means comprises at least two hydraulic valves for each motor, one of said valves being installed in a hydraulic line adjacent each of said ports of said motor, one of said valves controlling flow through one said motor port and the other said valves controlling flow through the other said motor port.

7. A hydraulic power transmission system comprising a plurality of reversible hydraulic motors, at least two motor ports for each said motor, a reversible-discharge hydraulic pump for said plurality of hydraulic motors, at least two pump ports for said pump, a control for reversing the direction of discharge and intake of said pump through said pump ports, a first hydraulic line leading from one pump port to corresponding motor ports of each said motor, a second hydraulic line leading from the other pump port to corresponding motor ports of each said motor, a first valve in each said first hydraulic line adjacent each said motor, a second valve in each said second hydraulic line adjacent each said motor, an electric circuit, comprising a pair of oppositely acting solenoids arranged to move said control in opposite directions, individual forward and reverse button switches adjacent each said motor and electric wiring connecting said various forward and reverse switches and said solenoids for actauting one of said solenoids upon closing of a forward switch to move said control to discharge said pump through one of said hydraulic lines and for actuating the other of said solenoids upon closing of a reverse switch to move said control to discharge said pump through the other of said hydraulic lines.

References Cited in the file of this patent

UNITED STATES PATENTS

| Number | Name | Date |
|---|---|---|
| 710,472 | Lake | Oct. 7, 1902 |
| 1,310,945 | De Martino et al. | July 22, 1919 |
| 1,706,441 | Daughs | Mar. 26, 1929 |
| 1,742,088 | Maxson | Dec. 31, 1929 |
| 1,814,826 | Carpenter | July 14, 1931 |
| 2,076,138 | Zilen | Apr. 6, 1937 |
| 2,254,083 | Nickles et al. | Aug. 26, 1941 |
| 2,289,387 | Stephens | July 14, 1942 |
| 2,330,505 | Matthias | Sept. 28, 1943 |
| 2,335,079 | Paterson | Nov. 23, 1943 |
| 2,349,284 | Kinzelman | May 23, 1944 |
| 2,354,182 | Christoffersen | July 25, 1944 |
| 2,385,779 | Evans | Oct. 2, 1945 |
| 2,453,267 | Rossmann | Nov. 9, 1948 |
| 2,518,578 | Tomlinson | Aug. 15, 1950 |
| 2,554,145 | Holdeman | May 22, 1951 |
| 2,559,832 | Slater | July 10, 1951 |
| 2,562,086 | Farrell | July 24, 1951 |